US010840976B2

(12) United States Patent
Watkins et al.

(10) Patent No.: US 10,840,976 B2
(45) Date of Patent: *Nov. 17, 2020

(54) CONFIGURING A DISTRIBUTED ANTENNA SYSTEM

(71) Applicant: CommScope Technologies LLC, Hickory, NC (US)

(72) Inventors: Daniel S. Watkins, Forest, VA (US); Edward B. Wagstaff, Forest, VA (US); Van E. Hanson, Forest, VA (US); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 573 days.

This patent is subject to a terminal disclaimer.

(21) Appl. No.: 15/425,909

(22) Filed: Feb. 6, 2017

(65) Prior Publication Data
US 2017/0149475 A1    May 25, 2017

Related U.S. Application Data

(63) Continuation of application No. 13/597,900, filed on Aug. 29, 2012, now Pat. No. 9,565,596.
(Continued)

(51) Int. Cl.
*H04W 28/02* (2009.01)
*H04W 28/20* (2009.01)
(Continued)

(52) U.S. Cl.
CPC .......... *H04B 7/04* (2013.01); *H04W 28/0247* (2013.01); *H04W 28/20* (2013.01);
(Continued)

(58) Field of Classification Search
CPC combination set(s) only.
See application file for complete search history.

(56) References Cited

U.S. PATENT DOCUMENTS

| 5,574,466 A | 11/1996 | Reed et al. |
| 5,627,879 A | 5/1997 | Russell et al. |

(Continued)

FOREIGN PATENT DOCUMENTS

| CN | 101631379 | 1/2010 |
| CN | 102077683 | 5/2011 |

(Continued)

OTHER PUBLICATIONS

State Intellectual Property Office of the People's Republic of China, "First Office Action for CN Application No. 201280048996.2", "from Foreign Counterpart to U.S. Appl. No. 13/597,900", dated Mar. 13, 2017, pp. 1-10, Published in: CN.

(Continued)

*Primary Examiner* — Andrew Lai
*Assistant Examiner* — M Mostazir Rahman
(74) *Attorney, Agent, or Firm* — Fogg & Powers LLC

(57) ABSTRACT

Systems and methods for developing a configuration plan for communication transport links of a distributed antenna system are provided. The distributed antenna system includes a unit communicating with remote antenna units over the communication transport links. The unit receives signals from base stations. Characteristics of each of the signals are determined. The characteristics include, for each signal, a frequency occupancy, a digital bandwidth, and a coverage zone to which to provide the signal. The frequency occupancy includes the minimum frequency component and the maximum frequency component of the signal. The digital bandwidth is a bandwidth for communicating the signal via the communication transport links. A hardware capability of the distributed antenna system, such as a respective available bandwidth for each communication transport link, is also determined. The configuration plan for transporting the digital representations of the signals is (Continued)

determined based on the hardware capability and the characteristics of the signals.

21 Claims, 7 Drawing Sheets

Related U.S. Application Data

(60) Provisional application No. 61/528,310, filed on Aug. 29, 2011.

(51) Int. Cl.
*H04B 7/04* (2017.01)
*H04B 7/022* (2017.01)
*H04W 88/08* (2009.01)
*H04W 16/28* (2009.01)
*H04W 28/18* (2009.01)

(52) U.S. Cl.
CPC ............ *H04B 7/022* (2013.01); *H04W 16/28* (2013.01); *H04W 28/18* (2013.01); *H04W 88/085* (2013.01)

(56) References Cited

U.S. PATENT DOCUMENTS

| | | | |
|---|---|---|---|
| 5,668,562 A | 9/1997 | Cutrer et al. |
| 5,682,256 A | 10/1997 | Motley et al. |
| 5,930,682 A | 7/1999 | Schwartz et al. |
| 5,969,837 A | 10/1999 | Farber et al. |
| 6,349,200 B1 | 2/2002 | Sabat, Jr. et al. |
| 6,353,600 B1 | 3/2002 | Schwartz et al. |
| 6,374,124 B1 | 4/2002 | Slabinski |
| 6,594,496 B2 | 7/2003 | Schwartz |
| 6,704,545 B1 | 3/2004 | Wala |
| 6,731,880 B2 | 5/2004 | Westbrook et al. |
| 6,785,558 B1 | 8/2004 | Stratford et al. |
| 6,801,767 B1 | 10/2004 | Schwartz et al. |
| 6,804,540 B1 | 10/2004 | Sheperd et al. |
| 6,826,163 B2 | 11/2004 | Mani et al. |
| 6,826,164 B2 | 11/2004 | Mani et al. |
| 6,831,901 B2 | 12/2004 | Millar |
| 6,961,545 B2 | 11/2005 | Tehrani et al. |
| 6,963,552 B2 | 11/2005 | Sabat, Jr. et al. |
| 7,127,175 B2 | 10/2006 | Mani et al. |
| 7,205,864 B2 | 4/2007 | Schultz, Jr. et al. |
| 7,286,507 B1 | 10/2007 | Oh et al. |
| 7,313,415 B2 | 12/2007 | Wake et al. |
| 7,398,106 B2 | 7/2008 | Conyers et al. |
| 7,400,832 B2 | 7/2008 | Beacham et al. |
| 7,423,988 B2 | 9/2008 | Hedin et al. |
| 7,469,105 B2 | 12/2008 | Wake et al. |
| 7,474,891 B2 | 1/2009 | Toms et al. |
| 7,483,504 B2 | 1/2009 | Shapira et al. |
| 7,548,695 B2 | 6/2009 | Wake |
| 7,574,234 B2 | 8/2009 | Conyers et al. |
| 7,593,450 B2 | 9/2009 | Conyers et al. |
| 7,610,046 B2 | 10/2009 | Wala |
| 7,640,019 B2 | 12/2009 | Conyers et al. |
| 7,702,365 B2 | 4/2010 | Phool |
| 7,756,020 B2 | 7/2010 | Usuda et al. |
| 7,764,655 B2 | 7/2010 | Ransome et al. |
| 7,787,854 B2 | 8/2010 | Conyers et al. |
| 7,813,451 B2 | 10/2010 | Binder et al. |
| 7,817,958 B2 | 10/2010 | Scheinert et al. |
| 7,822,148 B2 | 10/2010 | Shapira et al. |
| 7,831,255 B1 | 11/2010 | Gribble et al. |
| 7,840,190 B2 | 11/2010 | Saban et al. |
| 7,844,273 B2 | 11/2010 | Scheinert |
| 7,848,747 B2 | 12/2010 | Wala |
| 7,848,770 B2 | 12/2010 | Scheinert |
| 7,948,897 B2 | 5/2011 | Stuart et al. |
| 7,961,618 B1 | 6/2011 | Prasad et al. |
| 8,010,116 B2 | 8/2011 | Scheinert |
| 8,121,646 B2 | 2/2012 | Oren et al. |
| 8,175,649 B2 | 5/2012 | Saban et al. |
| 8,184,681 B2 | 5/2012 | Binder et al. |
| 8,195,224 B2 | 6/2012 | Saban et al. |
| 8,270,387 B2 | 9/2012 | Cannon et al. |
| 8,320,957 B2 | 11/2012 | Saban et al. |
| 8,325,693 B2 | 12/2012 | Hazani et al. |
| 8,325,759 B2 | 12/2012 | Hazani et al. |
| RE44,398 E | 7/2013 | Conyers et al. |
| 8,509,850 B2 | 8/2013 | Zavadsky et al. |
| 8,514,915 B2 | 8/2013 | Binder et al. |
| 8,542,768 B2 | 9/2013 | Kim et al. |
| 8,548,526 B2 | 10/2013 | Schmidt et al. |
| 8,583,100 B2 | 11/2013 | Koziy et al. |
| 8,594,133 B2 | 11/2013 | Shapira et al. |
| 8,682,338 B2 | 3/2014 | Lemson et al. |
| 8,724,664 B2 | 5/2014 | Stapleton et al. |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,817,848 B2 | 8/2014 | Lemson et al. |
| 8,824,595 B2 | 9/2014 | Kim et al. |
| 8,831,593 B2 | 9/2014 | Melester et al. |
| 8,848,766 B2 | 9/2014 | Lemson et al. |
| 8,929,288 B2 | 1/2015 | Stewart et al. |
| 8,948,155 B2 | 2/2015 | Cannon et al. |
| 9,025,956 B2 | 5/2015 | Stapleton et al. |
| 9,048,797 B2 | 6/2015 | Kim et al. |
| 9,106,453 B2 | 8/2015 | Wang et al. |
| 9,112,547 B2 | 8/2015 | Scheinert et al. |
| 9,137,078 B2 | 9/2015 | Stapleton et al. |
| 9,148,203 B2 | 9/2015 | Lemson et al. |
| 9,148,324 B2 | 9/2015 | Stapleton et al. |
| 9,148,839 B2 | 9/2015 | Hejazi et al. |
| 9,197,358 B2 | 11/2015 | Hejazi et al. |
| 9,225,296 B2 | 12/2015 | Kim |
| 9,236,897 B2 | 1/2016 | Stapleton et al. |
| 2002/0186436 A1 | 12/2002 | Mani et al. |
| 2002/0186674 A1 | 12/2002 | Mani et al. |
| 2002/0187809 A1 | 12/2002 | Mani et al. |
| 2002/0191565 A1 | 12/2002 | Mani et al. |
| 2003/0008664 A1* | 1/2003 | Stein ................ H04W 64/00 455/456.1 |
| 2004/0179852 A1 | 9/2004 | Westbrook et al. |
| 2004/0198453 A1 | 10/2004 | Cutrer et al. |
| 2004/0204105 A1 | 10/2004 | Liang et al. |
| 2005/0147067 A1 | 7/2005 | Mani et al. |
| 2005/0201323 A1 | 9/2005 | Mani et al. |
| 2005/0226625 A1 | 10/2005 | Wake et al. |
| 2005/0250468 A1 | 11/2005 | Lu et al. |
| 2005/0250503 A1 | 11/2005 | Cutrer |
| 2005/0259684 A1 | 11/2005 | Csapo |
| 2006/0083512 A1 | 4/2006 | Wake |
| 2006/0091972 A1 | 5/2006 | Schultz, Jr. et al. |
| 2006/0093354 A1 | 5/2006 | Beacham et al. |
| 2006/0094470 A1 | 5/2006 | Wake et al. |
| 2007/0047578 A1 | 3/2007 | Abe et al. |
| 2008/0181282 A1 | 7/2008 | Wala et al. |
| 2008/0192855 A1 | 8/2008 | Shapira et al. |
| 2009/0005096 A1* | 1/2009 | Scheinert ............ H04B 7/0691 455/513 |
| 2009/0122717 A1 | 5/2009 | Das et al. |
| 2009/0154621 A1 | 6/2009 | Shapira et al. |
| 2009/0156129 A1 | 6/2009 | Hassan et al. |
| 2009/0180429 A1 | 7/2009 | Stevens et al. |
| 2009/0252094 A1 | 10/2009 | Chang et al. |
| 2010/0008343 A1 | 1/2010 | Kish |
| 2010/0099451 A1 | 4/2010 | Saban et al. |
| 2010/0128676 A1 | 5/2010 | Wu et al. |
| 2010/0177760 A1 | 7/2010 | Cannon et al. |
| 2010/0178936 A1 | 7/2010 | Wala et al. |
| 2010/0184450 A1 | 7/2010 | Chen et al. |
| 2010/0202356 A1 | 8/2010 | Fischer et al. |
| 2010/0208656 A1 | 8/2010 | Oh |
| 2010/0278530 A1 | 11/2010 | Kummetz et al. |
| 2010/0309931 A1 | 12/2010 | Shapira et al. |
| 2011/0130163 A1 | 6/2011 | Saban et al. |
| 2011/0135013 A1 | 6/2011 | Wegener |
| 2011/0158081 A1 | 6/2011 | Wang et al. |

(56) References Cited

U.S. PATENT DOCUMENTS

| | | |
|---|---|---|
| 2011/0164878 A1 | 7/2011 | Ma et al. |
| 2011/0170476 A1 | 7/2011 | Shapira et al. |
| 2011/0206088 A1 | 8/2011 | Binder et al. |
| 2011/0222434 A1 | 9/2011 | Chen |
| 2011/0281530 A1 | 11/2011 | Hazani et al. |
| 2012/0039254 A1* | 2/2012 | Stapleton ............ H03F 1/3247 370/328 |
| 2012/0039320 A1* | 2/2012 | Lemson ............... H03F 1/3247 370/338 |
| 2012/0069880 A1 | 3/2012 | Lemson et al. |
| 2012/0155572 A1 | 6/2012 | Kim et al. |
| 2012/0176966 A1* | 7/2012 | Ling ..................... H04B 1/40 370/328 |
| 2012/0250740 A1 | 10/2012 | Ling |
| 2013/0064230 A1 | 3/2013 | Chun et al. |
| 2013/0071112 A1 | 3/2013 | Melester et al. |
| 2013/0114486 A1 | 5/2013 | Spedaliere et al. |
| 2013/0114963 A1 | 5/2013 | Stapleton et al. |
| 2013/0128810 A1 | 5/2013 | Lee et al. |
| 2013/0201916 A1 | 8/2013 | Kummetz et al. |
| 2013/0295980 A1 | 11/2013 | Reuven et al. |
| 2013/0329825 A1 | 12/2013 | Oren et al. |
| 2014/0010168 A1 | 1/2014 | Stapleton et al. |
| 2014/0036770 A1 | 2/2014 | Stapleton et al. |
| 2014/0037292 A1 | 2/2014 | Stapleton et al. |
| 2014/0057627 A1 | 2/2014 | Hejazi et al. |
| 2014/0064399 A1 | 3/2014 | Oren et al. |
| 2014/0072064 A1 | 3/2014 | Lemson et al. |
| 2014/0072071 A1 | 3/2014 | Berlin et al. |
| 2014/0072299 A1 | 3/2014 | Stapleton et al. |
| 2014/0079077 A1 | 3/2014 | Saban et al. |
| 2014/0079153 A1 | 3/2014 | Kim et al. |
| 2014/0162664 A1 | 6/2014 | Stapleton et al. |
| 2014/0162713 A1 | 6/2014 | Stapleton et al. |
| 2014/0206282 A1 | 7/2014 | Stapleton et al. |
| 2014/0233468 A1 | 8/2014 | Hejazi et al. |
| 2014/0286247 A1 | 9/2014 | Lemson et al. |
| 2014/0313884 A1 | 10/2014 | Stapleton et al. |
| 2015/0080054 A1 | 3/2015 | Kim et al. |
| 2016/0080082 A1 | 3/2016 | Lemson et al. |

FOREIGN PATENT DOCUMENTS

| | | |
|---|---|---|
| EP | 1807939 | 7/2007 |
| WO | 2008027213 | 3/2008 |
| WO | 2009039396 | 3/2009 |
| WO | 2013009835 | 1/2013 |
| WO | 2013033199 | 3/2013 |

OTHER PUBLICATIONS

Australian Patent Office, "Examination Report No. 2 for Standard Patent Application", "from foreign counterpart to U.S. Appl. No. 13/597,900", dated Jan. 12, 2017, pp. 1-3, Published in: AU.

Australian Patent Office, "Office Action", "from foreign counterpart to U.S. Appl. No. 13/597,900", dated Jan. 25, 2016, Published in: AU.

European Patent Office, "Extended European Search Report for EP Application 12826731.7", "from Foreign Counterpart to U.S. Appl. No. 13/597,900", dated Mar. 12, 2015, pp. 1-10, Published in: EP.

European Patent Office, "Rule 71(3) for EP Application No. 12826731.7", "from foreign counterpart of U.S. Appl. No. 13/597,900", dated Feb. 5, 2016, pp. 1-53, Published in: EP.

United States Patent and Trademark Office, "Final Office Action", "from U.S. Appl. No. 13/597,900", dated Sep. 30, 2015, pp. 1-43, Published in: US.

United States Patent and Trademark Office, "Notice of Allowance", "from U.S. Appl. No. 13/597,900", dated Jan. 20, 2016, pp. 1-8, Published in: US.

United States Patent and Trademark Office, "Notice of Allowability", "from U.S. Appl. No. 13/597,900", dated Apr. 6, 2016, pp. 1-3, Published in: US.

United States Patent and Trademark Office, "Notice of Allowance", "from U.S. Appl. No. 13/597,900", dated May 11, 2016, pp. 1-24, Published in: US.

United States Patent and Trademark Office, "Notice of Allowance", "from U.S. Appl. No. 13/597,900", dated Sep. 30, 2016, pp. 1-8, Published in: US.

United States Patent and Trademark Office, "Office Action", "from U.S. Appl. No. 13/597,900", dated Mar. 17, 2014, pp. 1-21, Published in: US.

United States Patent and Trademark Office, "Office Action", "from U.S. Appl. No. 13/597,900", dated Feb. 27, 2015, pp. 1-37, Published in: US.

International Search Authority, "International Search Report for PCT/US2012/052845", "Foreign Counterpart to U.S. Appl. No. 13/597,900", dated Jan. 30, 2013, pp. 1-8, Published in: WO.

International Search Authority, "International Search Report for PCT/US2012/046207", "Foriegn Counterpart to U.S. Appl. No. 13/546,245", dated Nov. 15, 2012, pp. 1-9, Published in: WO.

Australian Patent Office, "Notice of Acceptance", "from foreign counterpart to U.S. Appl. No. 13/597,900", dated Feb. 2, 2017, pp. 1-3, Published in: AU.

State Intellectual Property Office of the People's Republic of China, "Notice of Grant from CN Application No. 201280048996.2 dated Sep. 28, 2017", "from Foreign Counterpart of US. Appl. No. 13/597,900", dated Sep. 28, 2017, pp. 1-3, Published in: CN.

* cited by examiner

CONFIGURING A DISTRIBUTED ANTENNA SYSTEM

CROSS-REFERENCE TO RELATED APPLICATIONS

This application is a continuation of U.S. application Ser. No. 13/597,900 filed Aug. 29, 2012, and titled "Configuring a Distributed Antenna System," which claims the benefit of U.S. Provisional Application Ser. No. 61/528,310 filed on Aug. 29, 2011, and titled "Configuring a Distributed Antenna System," wherein the contents of all of the foregoing applications are hereby incorporated by reference.

TECHNICAL FIELD

The present invention relates generally to telecommunications and, more particularly (although not necessarily exclusively), to systems and methods for configuring a distributed antenna system.

BACKGROUND

A distributed antenna system ("DAS") can be used to extend the coverage of a cellular communication system to areas of traditionally low signal coverage, such as within buildings, tunnels, or in areas obstructed by terrain features. A DAS can extend coverage by receiving signals from a base station of a cellular communication system and re-transmitting the signals directly into low-coverage areas. A DAS can include a master unit in communication with carrier systems, such as base stations of cellular service providers, and a group of remote antenna units. The remote antenna units can be physically separate from the master unit, but in communication with the master unit over a serial link. A remote antenna unit can wirelessly communicate signals to wireless devices positioned in a coverage area.

The master unit can receive signals from multiple base stations. Signals from different base stations may have frequencies within common frequency bands. Signals from different base stations may also be provided to different remote antenna units.

The DAS can include communication transport links between a master unit and the remote antenna units. The communication transport links can provide signal paths between a base station and the remote antenna units. Configuring the DAS by determining the communication transport links over which signals are provided can be difficult.

One method for assigning signals to communication transport links uses hardware included in each communication transport link. For example, the DAS can include RF switches and a switching matrix for a technician to assign signals from multiple base stations to specific communication transport links. Hardware-based solutions may be impractical and costly as the size and complexity of a DAS increases, such as for a DAS having complex systems of many remote antenna units. For example, hardware may lack flexibility that is helpful in accounting for system changes. Furthermore, modifying the configuration subsequent to deployment can be difficult generally, and impossible to complete while allowing the DAS to continue to function.

Accordingly, systems and methods are desirable for configuring communication transport links of a DAS.

SUMMARY

In one aspect, a method for developing a configuration plan for communication transport links of a distributed antenna system is provided. The distributed antenna system includes a unit in communication with remote antenna units over the communication transport links. The unit can receive signals from at least one base station. The method involves determining characteristics of each of the signals. The characteristics for each signal can include a respective frequency occupancy of the signal, a respective digital bandwidth of the signal, and a respective coverage zone to which to provide the signal. The frequency occupancy can include the minimum frequency component and the maximum frequency component of the signal. The digital bandwidth can include a bandwidth for communicating the signal via the communication transport links. The method also involves determining a hardware capability of the distributed antenna system. The hardware capability includes a respective available bandwidth for each communication transport link. The method also involves determining the configuration plan based on the hardware capability and the characteristics of the signals. The configuration plan specifies a configuration of the communication transport links for transporting the digital representations of the signals. The method also involves outputting the configuration plan.

In another aspect, a system for developing a configuration plan of a distributed antenna system is provided. The system includes a unit and a processor disposed in the unit. The unit can receive signals from a base station and communicate the signals to remote antenna units via communication transport links of the distributed antenna system. The processor can determine an association of coverage zones with coverage sets. Each coverage zone represents a subset of the remote antenna units. Each coverage set includes band sets to be provided to a common coverage zone. Each band set includes a subset of the signals. Each band set is represented by a band stream. The processor can also determine a hardware capability of the distributed antenna system. The hardware capability includes a respective available bandwidth for each communication transport link. The processor can also determine the configuration plan based on the available bandwidth of each communication transport link, a respective frequency occupancy of each band set, a respective digital bandwidth of each band set, and associations between the coverage zones and the respective coverage sets. The frequency occupancy for the band set includes the minimum frequency component and the maximum frequency component of the signals of the band sets. The digital bandwidth includes a bandwidth for communicating the signal via the respective communication transport link. The processor can also output the configuration plan.

In another aspect, a distributed antenna system is provided. The distributed antenna system includes remote antenna units grouped into coverage zones and a unit in communication with the remote antenna units over communication transport links. Each coverage zone includes a subset of the remote antenna units. The unit includes a configuration module. The configuration module is configured for determining characteristics of signals. The characteristics for each signal can include a respective frequency occupancy of the signal, a respective digital bandwidth of the signal, and a respective coverage zone to which to provide the signal. The frequency occupancy can include the minimum frequency component and the maximum frequency component of the signal. The digital bandwidth can include a bandwidth for communicating the signal via the communication transport links. The configuration module is also configured for determining a hardware capability of the distributed antenna system. The hardware capability includes a respective available bandwidth for each communication transport link. The configuration module is also configured for determining a configuration plan based on the hardware capability and the characteristics of the signals. The configuration plan specifies a configuration of the communication transport links for transporting the digital representations of the signals. The configuration module is also configured for outputting the configuration plan.

DETAILED DESCRIPTION

Figure 1:
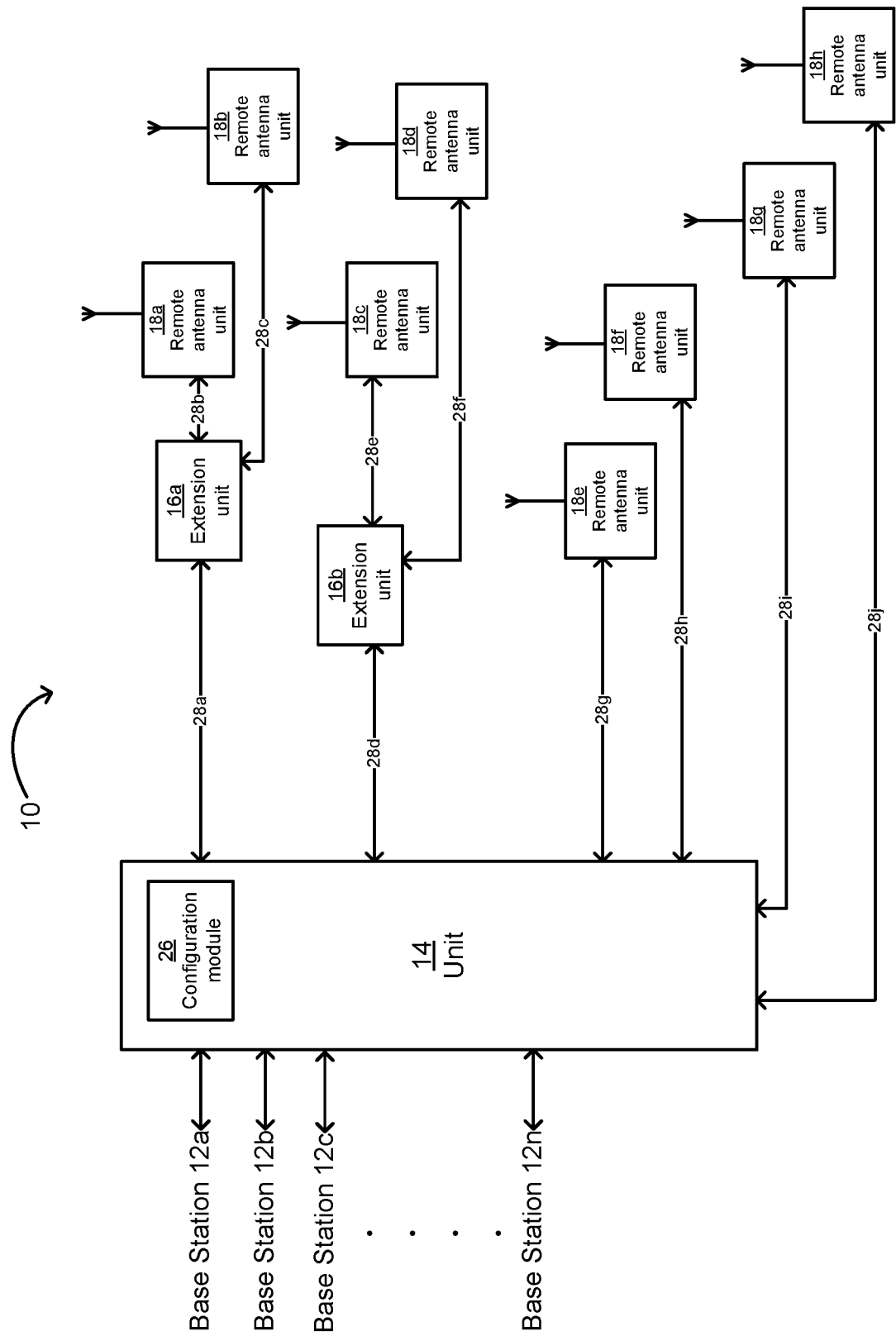
FIG. 1 is a block diagram of a distributed antenna system in which a configuration module for configuring the distributed antenna system is disposed according to one aspect.

Certain aspects and examples of the present invention are directed to a configuration module for a DAS that can automatically develop a plan for configuring communication transport links in the DAS. The configuration module can be disposed in a unit of the DAS, such as (but not limited) a master unit. The unit can communicate signals from one or more base stations to the remote antenna units over the communication transport links, either directly or via one or more extension units. The configuration module can determine characteristics for each signal, such as a respective frequency occupancy of the signal, a respective digital bandwidth of the signal, and a respective coverage zone to which to provide the signal. The configuration module can also determine a respective available bandwidth for each communication transport link as well as other hardware capabilities for the DAS. The configuration module can generate and output a configuration plan for the communication transport links based on the hardware capability and characteristics. The configuration plan can include an assignment of signals communicated via the unit to communication transport links between the unit and the remote antenna units, communication transport links between the unit and an extension unit, and/or communication transport links between the extension unit and the remote antenna units.

As used herein, the term "communication transport link" can include one or more physical connections providing a signal path between devices in a telecommunication system, such as (but not limited to) master units and remote antenna units of a DAS. A communication transport link can include any type of communication medium over which signals can be communicated between devices in a telecommunication system. Non-limiting examples of suitable communication mediums include copper cable (such as a coaxial cable), optical fiber, and microwave link. A communication transport link can have characteristics that limit the number of signals that can be provided over the communication transport link. A non-limiting example of such characteristics includes the total bandwidth of signal transportation provided by the communication transport link.

As used herein, the term "bandwidth" can include an analog bandwidth or a digital bandwidth. An analog bandwidth can be associated with an analog signal received by a distributed antenna system from a base station. A digital bandwidth can be associated with a digital signal communicated via the communication transport links of a distributed antenna system. For example, an analog signal communicated via an analog frequency channel having an analog bandwidth of 5 MHz may be communicated via a digital link having a digital bandwidth of 60 MHz.

As used herein, the term "the frequency occupancy" can include a range of frequencies for frequency components of a signal or a group of signals. The frequency occupancy of a signal or a group of signals can include (or be described with respect to) the minimum frequency component of the signal and a maximum frequency component of the signal.

As used herein, the term "assignment of signals" can include identifying one or more coverage zones to which a signal will be provided, associating the coverage zones with coverage sets, and determining the communication transport link over which to provide each coverage set to its associated coverage zone.

As used herein, the term "coverage zone" can include a geographical area in a telecommunication system, such as a DAS, in which wireless devices can communicate with one or more remote antenna units providing signal coverage to the geographical area. Each remote antenna unit can be assigned to a coverage zone. In some aspects, sub-sets of the remote antenna units within a coverage zone may be assigned to transmit different sub-sets of a group of signals provided to the coverage zone.

As used herein, the term "coverage set" can include a grouping of band sets to be provided to a coverage zone. Each coverage set may be associated with one or more coverage zones.

As used herein, the term "band set" can include a set of signals having an association with a common coverage zone. A band set can include the signals from one or more base stations. A band set can include a set of signals having a common frequency band. In additional or alternative aspects, a band set can include signals from individual channels of assigned frequency bands. The individual channels of assigned frequency bands can be channels from different frequency bands, such as RF bands. The band set may include signals from multiple channels from respective multiple frequency bands. In additional or alternative aspects, a band set can include signals from individual channels from different frequency bands mapped to a common base band. In additional or alternative aspects, signals from base stations can be combined into band sets based on the bandwidth of the signals, the start frequencies of the signals, and the stop frequencies of the signals.

Signals can be transmitted via the DAS as digital data streams representing the signals received from the base stations. A digital data stream can include a series of digital samples representing a signal. The signals transmitted via the DAS can be grouped into band sets. Grouping the signals into band sets can include combining digital data streams representing signals in a given frequency band into a combined signal that is a band stream. The band stream may be a single digital data stream representing the combined signals included in the band set. The band stream may have a band stream bandwidth. The band stream bandwidth can include the combined bandwidths of the signals of the band set represented by the band stream.

A configuration module can develop a plan for configuring the communication transport links based on the hardware capability of the DAS and characteristics of the signals transported via the DAS. Non-limiting examples of the hardware capability of the DAS can include one or more of the number of communication transport links between each unit and each remote antenna unit, the maximum bandwidth that can be provided over each communication transport link, the maximum number of band streams capable of being provided over each of the communication transport links, etc. Non-limiting examples of characteristics of the signals transported via the DAS include one or more of the bandwidth of each signal, the bandwidth of each band stream included in a coverage set, the coverage zone to which the coverage set is being provided, etc.

In some aspects, the configuration module can develop the plan based on an association of coverage zones with coverage sets by sorting the band sets in a coverage set based on the bandwidth of each band set. Band sets can sorted from largest to smallest bandwidth. The configuration module can assign each band set to a communication transport link in order of decreasing bandwidth until either the maximum bandwidth of the communication transport link or maximum number of band sets that can be provided over the communication transport link is reached. If no additional band sets can be provided over the first communication transport link, the configuration module can select a second communication transport link and continue assigning band sets in decreasing order of the bandwidth of the sorted band sets. The configuration can iteratively continue this process until all band sets are assigned or until no more communication transport links are available.

In other aspects, the configuration module can group the band sets in a coverage set into separate subsets for common band sets, shared band sets, and zone-specific band sets. Common band sets can include band sets that are provided to all of the coverage zones in a DAS. Shared band sets can include band sets that are provided to more than one but fewer than all of the coverage zones in a DAS. Zone-specific band sets can include band sets that are provided to a single coverage zone in a DAS. The configuration module can assign all common band sets in order of decreasing bandwidth to communication transport links, assign all shared band sets in order of decreasing bandwidth, and assign zone-specific band sets in order of decreasing bandwidth.

The configuration module can output the plan via any suitable mechanism, such as providing the plan for display in a graphical user interface. The outputted plan can be used to select each communication transport link over which the unit can provide each band set to each of the destination coverage zone. In other aspects, outputting the plan can include a system controller automatically executing the plan for the DAS.

Detailed descriptions of these aspects and examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention.

FIG. 1 depicts a DAS 10 in which a configuration module 26 for configuring the DAS 10 is disposed. The DAS 10 can include a unit 14, extension units 16*a-b*, and remote antenna units 18*a-h*. The DAS 10 can be positioned in an area of low signal coverage, such as the interior of a building, to extend wireless communication coverage. Extending wireless coverage can include communicating signals between base stations 12*a-n* and wireless devices positioned in a coverage area of the DAS 10.

The DAS 10 can receive downlink signals from one or more base stations 12*a-n* via a wired or wireless communication medium. The DAS 10 can also provide uplink signals to the base stations 12*a-n*.

The unit 14 can communicate uplink and downlink signals between the base stations 12*a-n* and one or more remote antenna units 18*a-h* distributed in the environment to provide coverage within a service area of the DAS 10. A non-limiting example of a unit 14 is a master unit, such as (but not limited to) a digital conversion station.

The unit 14 can convert downlink signals received from the base stations 12*a-n*, such as RF signals, into one or more digital data streams. A group of signals represented by digital data streams can form a band set. The unit 14 can include circuitry, such as summers or multiplexers, configured to combine the digital data streams within a band set into a band stream. The band stream may be a single digital data stream that includes the digital data streams representing the signals in a band set. In some aspects, combining the digital data streams can include summing or adding signals within a band set. In other aspects, combining the digital data streams can include multiplexing the digital data streams into a serialized band stream.

The unit 14 can provide downlink signals, such as digital data streams, to the remote antenna units 18*a-d* via one or more extension units 16*a-b*. A non-limiting example of an extension unit is a transport extension node. The extension units 16*a-b* can extend the range of the unit 14. For example, a unit 14 may transmit optical downlink signals over an optical fiber link to extension units 16*a-b*. The extension units 16*a-b* can convert the optical downlink signals to electrical downlink signals and provide the electrical downlink signals to remote antenna units 18*a-d* over a copper cable, such as a coaxial cable, or other suitable communication medium.

The unit 14 can also directly provide downlink signals to the remote antenna units 18*e-h*. Directly providing downlink signals can include, for example, communicating the downlink signals from the unit 14 to the remote antenna units 18*e-h* without the downlink signals being received by a separate communication device, such as a transport extension node or other device, in the signal path between the unit 14 and a remote antenna unit.

The remote antenna units 18*a-h* can convert digital data streams to RF signals. The remote antenna units 18*a-h* can amplify the downlink signals and radiate the downlink signals to a number of different wireless devices, such as (not limited to) cellular phones, operating in the environment of the DAS 10. A non-limiting example of a remote antenna unit is a universal access point.

A group of one or more remote antenna units 18*a-h* can service a coverage zone. Each coverage zone can be a geographical area in the DAS 10 environment where certain wireless devices can communicate with the group of remote antenna units. For example, the remote antenna units 18*a-d* can be included in a coverage zone servicing a first area where wireless devices are located and the remote antenna units 18e-h can be included in a coverage zone servicing a different area where wireless devices are located.

In an uplink direction, the remote antenna units 18a-h can receive uplink RF signals, convert them to digital data streams, and provide the uplink digital data streams to the unit 14 or the extension units 16a-b. The extension units 16a-b can combine uplink digital data streams into combined digital data streams, such as band streams, and provide the combined digital data streams to the unit 14. In some aspects, the unit 14 can convert uplink digital data streams received from the remote antenna units 18a-h or the extension units 16a-b into uplink RF signals. The unit 14 can provide the uplink RF signals to the base stations 12a-n. In other aspects, the unit 14 can convert uplink digital data streams received from the remote antenna units 18a-h into digital signals formatted for transmission to the base stations 12a-n that communicate using digital signals, in a standardized digital format or otherwise.

The unit 14, extension units 16a-b, and remote antenna units 18a-h can communicate via communication transport links 28a-j. A communication transport link can include one or a series of physical connections over which a remote antenna unit can communicate with the unit 14 directly or through an extension unit. A communication transport link can include any type of communication medium capable of transporting signals between the unit 14, the extension units 16a-b, and the remote antenna units 18a-h. Each of the communication transport links 28a-j can have a maximum available bandwidth or be associated with a maximum number of digital data streams that can be provided over the communication transport link. The maximum available bandwidth or a maximum number of digital data streams can be determined from the type of communication medium used for the communication transport link.

Although the DAS 10 is depicted as including one unit 14, two extension units 16a-b, and eight remote antenna units 18a-h, any number (including one) of each can be used. For example, a typical DAS 10 may include dozens of extension units and hundreds of remote antenna units.

The DAS 10 can also include a configuration module 26 disposed in the unit 14. In other aspects, the configuration module 26 can be disposed in a system controller external to the unit 14 that can control the unit 14.

The configuration module 26 can determine a plan for configuring the communication transport links 28a-j between various components of the DAS 10. The configuration module 26 can output the plan to the DAS 10 or to a display via a graphical user interface. The outputted plan can be used to select the communication transport links 28a-j over which the unit 14 provides the band sets to the remote antenna units. In some aspects, outputting the plan can include the unit 14 automatically configuring the communication transport links 28a-j. In other aspects, the plan is outputted to a user via the graphical user interface. The user can manually configure the communication transport links 28a-j using the plan.

Figure 2:
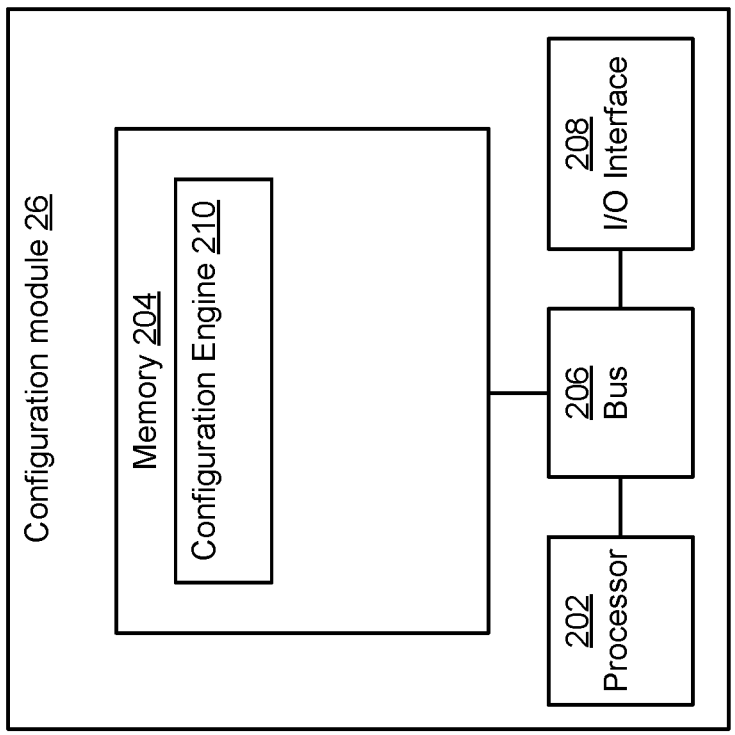
FIG. 2 is a functional block diagram of a configuration module according to one aspect.

FIG. 2 depicts an example of the configuration module 26. The configuration module 26 may be any device that can process data and execute code that is a set of instructions to perform actions. The configuration module 26 includes a processor 202, a memory 204, a bus 206, and an input/output (I/O) interface 208. The memory 204 includes a configuration engine 210.

The processor 202 can execute code stored on a computer-readable medium, such as the memory 204, to cause the configuration module 26 to determine a plan for configuring the communication transport links 28a-j in the DAS 10. Non-limiting examples of a processor 202 include a microprocessor, an application-specific integrated circuit ("ASIC"), a field-programmable Gate Array ("FPGA"), or other suitable processor. The processor 202 may include one processor or any number of processors.

The processor 202 can access code stored in the memory 204 via a bus 206. Memory 204 may be any non-transitory computer-readable medium capable of tangibly embodying code and can include electronic, magnetic, or optical devices. Non-limiting examples of a memory 204 include random access memory (RAM), read-only memory (ROM), magnetic disk, an ASIC, a configured processor, or other storage device. Bus 206 may be any device capable of transferring data between components of the configuration module 26. Bus 206 can include one device or multiple devices.

Instructions can be stored in the memory 204 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The configuration module 26 can receive through an I/O interface 208 inputs such as characteristics of the signals communicated through the DAS 10 and the hardware capabilities of the components of DAS 10. The configuration module 26 can store the inputs in the memory 204. In some aspects, the inputs are received via a graphical user interface that may be displayed on a separate computing device or on a display associated with the configuration module 26. In addition, data files including various types of data can be stored in the memory 204. Such data can include hardware capabilities associated with various components of the DAS 10, such as the maximum bandwidth or maximum number of digital data stream that can be provided over certain types of communication mediums used for communication transport links 28a-j.

The instructions can include the configuration engine 210. When executed by the processor 202, the configuration engine 210 can determine the plan for configuring the communication transport links 28a-j, as explained in more detail below. The configuration engine 210 can also generate control signals for configuration module 26 to provide to the unit 14.

This exemplary system configuration is provided to illustrate configurations of certain aspects. Other configurations and examples may of course be utilized.

Figure 3:
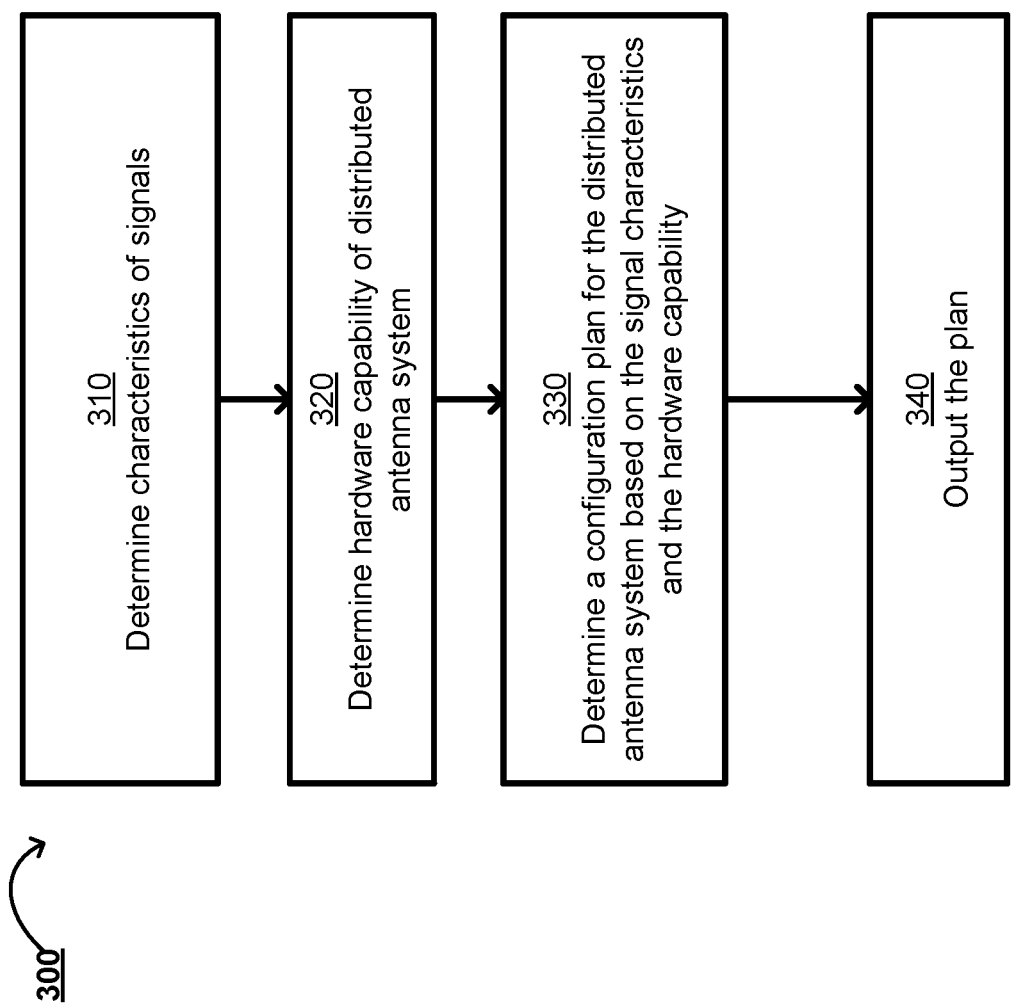
FIG. 3 is a flow chart illustrating a process for configuring a distributed antenna system according to one aspect.

FIG. 3 depicts a flow chart illustrating a process 300 for configuring communication transport links according to one aspect. The process 300 is described with reference to the DAS 10 depicted in FIG. 1 and the system implementation of configuration module 26 depicted in FIG. 2. Other implementations and processes, however, are possible.

In block 310, the configuration engine 210 determines characteristics of the signals to be communicated using the DAS 10. Non-limiting examples of signal characteristics include the frequency band of a signal, the bandwidth of the signal, a digital bandwidth for transporting a digital representation of the signal, a frequency occupancy of each signal, etc. The frequency band and bandwidth may be associated with the type of signal received from each of the base stations 12a-n, such as signals transmitted using a Global System for Mobile Communications ("GSM") standard. Another signal characteristic that may be received by configuration engine 210 is the coverage zone to which the signal is to be provided.

In some aspects, the configuration engine 210 can receive inputs via the I/O interface 208 regarding the signal characteristics. For example, the configuration engine 210 may receive inputs for one or more of the signals regarding the coverage zone to which the signal or signals are to be provided. In other aspects, the configuration engine 210 can receive the signal characteristics from the unit 14. For example, the unit 14 may determine the frequency band and bandwidth associated with the signals received from the base stations 12a-n. The configuration engine 210 can receive the bandwidths and frequency bands from the unit 14. In other aspects, the configuration engine 210 can receive the signal characteristics from the base stations 12a-n.

In block 320, the configuration engine 210 determines a hardware capability of the DAS 10. Non-limiting examples of the hardware capability include the available bandwidth for each of the communication transport links 28a-j in the DAS 10, the maximum number of digital data streams capable of being provided over each of the communication transport links 28a-j, and the association of communication transport links with the remote antenna units in a coverage zone. In some aspects, the configuration engine 210 can determine the hardware capability based on inputs received via the I/O interface 208. In other aspects, the configuration engine 210 can determine the hardware capability by requesting information about each of the communication transport links 28a-j from the unit 14 and/or extension units 16a-b. Such information can include the types of communication mediums used by the communication transport links 28a-j. The configuration engine 210 can reference a data file stored in the memory 204 containing a table that lists the bandwidths associated with different types of communication mediums.

In block 330, the configuration engine 210 determines a plan for configuring the DAS 10 based on the characteristics of the signals and the hardware capability of the DAS 10. The plan can include configuring the communication transport links between a unit 14 and a remote antenna unit, between a unit 14 and an extension unit, and/or between an extension unit and a remote antenna unit. Determining a configuration plan can include assigning signals to the communication transport links 28a-j. Assigning the signals can include identifying which communication transport links 28a-j are available to provide a signal to a coverage zone. In some aspects, the configuration engine 210 can determine the available communication transport links from inputs received via the I/O interface 208 of the configuration module 26. In other aspects, the configuration engine 210 can determine the available communication transport links by requesting information about the communication transport links from the unit 14 and/or extension units 16a-b. Assigning the signals can also include determining whether the hardware capability, such as the available bandwidth or maximum number of digital data streams, of the identified communication transport links allows the signal to be provided to the coverage zone over the identified communication transport links.

Signals can be grouped into coverage sets in assigning signals to the communication transport links 28a-j. Each coverage set can include a collection of signals to be provided to a coverage zone. Each coverage set can be associated with one or more coverage zones. Determining the plan for configuring the communication transport links 28a-j can include assigning a coverage set to one or more communication transport links 28a-j over which signals in the coverage set are to be provided one or more coverage zones associated with the coverage set. In some aspects, signals can be grouped into coverage sets and assigned to the coverage zones based on inputs received via the I/O interface 208.

In block 340, the configuration engine 210 outputs the plan. Outputting the plan can include providing the plan via the I/O interface 208 for display in a graphical user interface to a user. The user can configure the unit 14 and the extension units 16a-b based on the plan provided by configuration engine 210. In other aspects, the configuration engine 210 can generate a control signal for configuring the communication transport links 28a-j. The configuration module 26 can provide the control signal to the unit 14 for determining, for each signal, the communication transport links over which to provide the signal.

Figure 4:
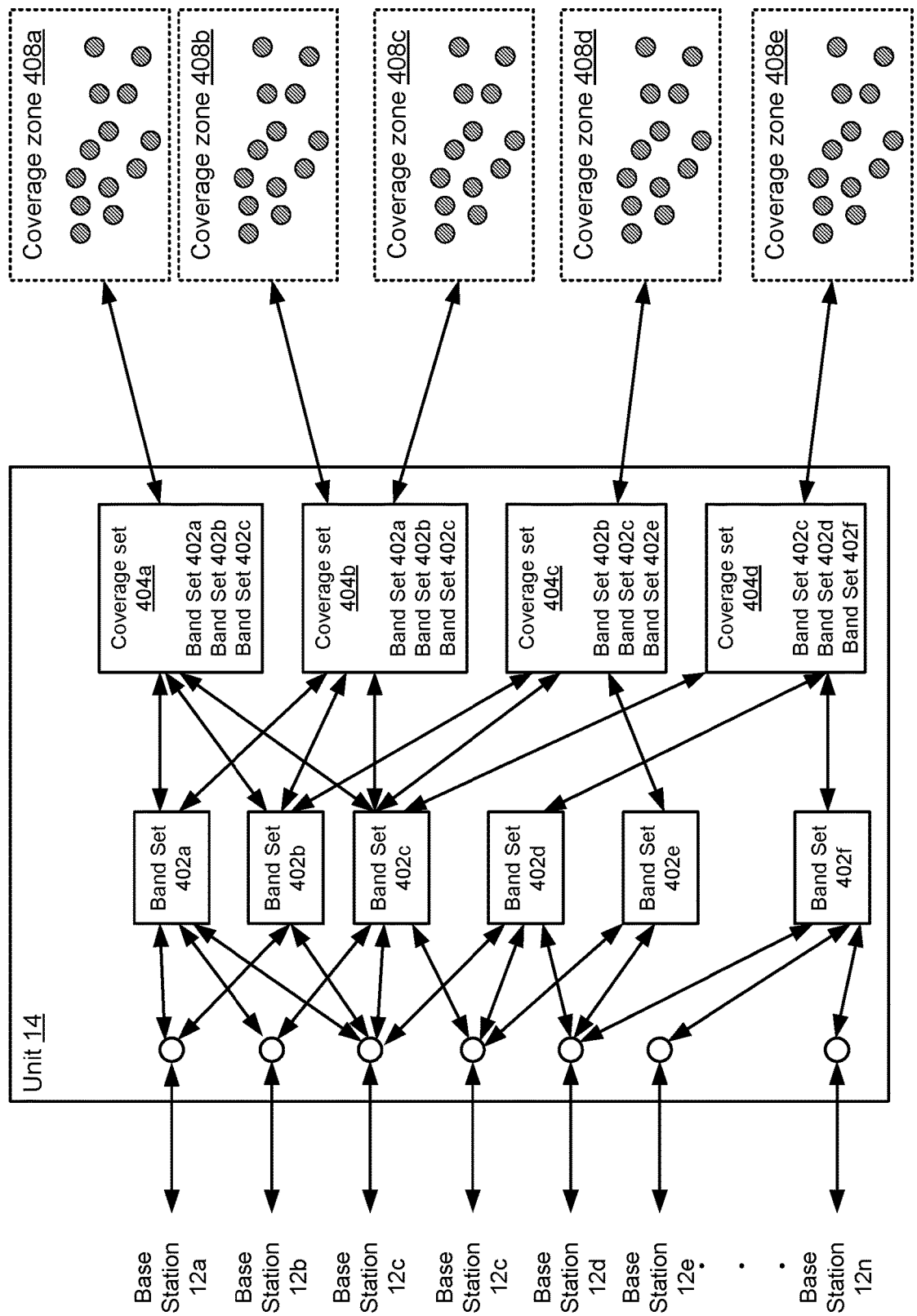
FIG. 4 is a modeling diagram illustrating assignment of band sets to coverage zones via coverage sets by a unit according to one aspect.

FIG. 4 depicts a model of relationships between signals and coverage zones generated by the configuration engine 210 for use in formulating a configuration plan. The configuration engine 210 can group signals that the unit 14 receives from the base stations 12a-n into band sets 402a-f, group the band sets 402a-f into coverage sets 404a-d, and assign coverage sets 404a-d to the communication transport links 28a-j for delivery to the coverage zones 408a-e. Each of the coverage sets 404a-d can include one or more band sets 402a-f. Coverage sets can include the same band sets (e.g., coverage sets 404a-b) or different band sets (e.g. coverage sets 404c-d).

The configuration engine 210 can receive an identification of each of the coverage zones 408a-e. Each of the coverage zones 408a-e can include a subset of the remote antenna units, depicted as darkened circles in FIG. 4, of the DAS 10. Each of the coverage zones 408a-e can service a physical area within the environment of the DAS 10.

The configuration engine 210 can receive characteristics about the signals that unit 14 receives from base stations 12a-n. The characteristics can include, for each signal, a bandwidth and one or more of the coverage zones 408a-e to which the signal is to be provided. In some aspects, the configuration engine 210 can receive an assignment, for each signal, to a destination coverage zone to which the signal is to be provided. The configuration engine 210 can receive the assignment as input via the I/O interface 208. For example, the configuration engine 210 may receive, via the I/O interface 208, an identification of coverage zones and a command that signals at specific frequency bands or received from specific base stations are to be provided to specific coverage zones. In other aspects, the configuration engine 210 can receive the identification of coverage zones and assignments of signals to the destination coverage zones from automation algorithms for assigning signals to the coverage zones 408a-e. The automation algorithms can be stored in the memory 204 and executed by processor 202.

The configuration engine 210 can also receive a frequency band and associated bandwidth for each of the signals received from the base stations 12a-n. For example, the base stations 12a-n may provide signals in the GSM-900 band of 935-960 MHz with a bandwidth of 200 kHz, in the GSM-1800 band of 1704-1734 MHz with a bandwidth of 200 kHz, in the GSM-1900 band of 1930-1990 MHz with a bandwidth of 200 kHz, or any frequency bands and bandwidths used by one or more telecommunication systems using the DAS 10.

The configuration engine 210 can group the signals from the base stations 12a-n into band sets 402a-f. In some aspects, each of the band sets 402a-f can be associated with a different frequency band. For example, the band set 402*a* may be associated with a GSM-900 band, the band set 402*b* may be associated with a GSM-1800 band, the band set 402*c* may be associated with a GSM-1900 band, etc.

The configuration engine 210 can combine the signals in a band set into a band stream representing the band set. Combining the signals in a band set into a band stream can reduce the number of digital data streams used to provide a band set to a coverage zone. Reducing the number of digital data streams provided to a coverage zone can reduce the number of communication transport links used for communicating signals between a unit 14 and the coverage zone.

The configuration engine 210 can group each of the band sets 402*a-f* into one or more coverage sets 404*a-d*. Each of the coverage sets 404*a-d* can also be associated with one or more coverage zones 408*a-e*. Each of the coverage sets 404*a-d* can include the band sets that are to be provided to a coverage zone.

For example, the configuration engine 210 can receive input assigning the band sets 402*a-c* to coverage zones 408*a-c*, band sets 402*b*, 402*c*, 402*e* to coverage zone 408*d*, and band sets 402*c*, 402*d*, 402*f* to coverage zone 408*e*. Based on the input, the configuration engine 210 can assign each of the band sets 402*a-c* to coverage sets 404*a-b*, each of the band sets 402*b*, 402*c*, 402*e* to coverage set 404*c*, and the band sets 402*c*, 402*d*, 402*f* to coverage set 404*d*. The configuration engine 210 can associate the coverage set 404*a* with the coverage zone 408*a*, the coverage set 404*b* with the coverage zones 408*b-c*, the coverage set 404*c* with the coverage zone 408*d*, and the coverage set 404*d* with the coverage zone 408*e*. The configuration engine 210 can determine and output a plan to configure the communication transport links for transporting data streams representing the band sets 402*a-f* based on the association between coverage sets 404*a-d* and coverage zones 408*a-e*.

Figure 5:
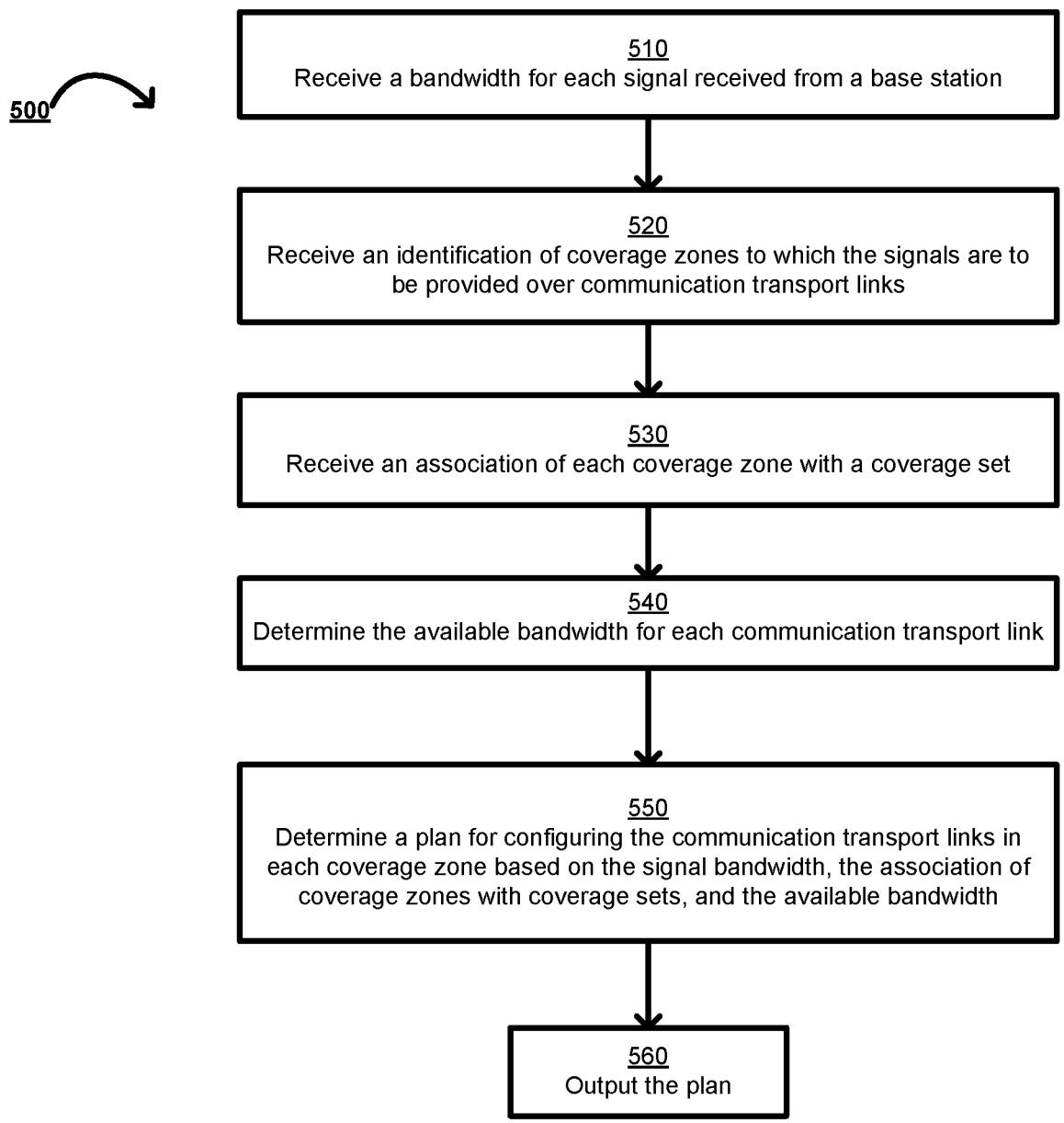
FIG. 5 is a flow chart illustrating a process for configuring communication transport links of a distributed antenna system based on the available bandwidth of the communication transport links according to one aspect.

FIG. 5 illustrates a process 500 for configuring the communication transport links 28*a-j* of the DAS 10 based on the association of coverage sets 404*a-d* and coverage zones 408*a-e* according to one aspect.

In block 510, the configuration engine 210 receives bandwidths for signals received from base stations 12*a-n*. In some aspects, the configuration engine 210 detects a bandwidth of a signal by analyzing the signal. In other aspects, the configuration engine 210 can reference a data file in the memory 204 that includes information about the signals received from the base stations 12*a-n*. The data file can identify the bandwidths of signals provided by each of the base stations 12*a-n*.

In block 520, the configuration engine 210 receives an identification of coverage zones 408*a-e* to which the signals are to be provided over communication transport links 28*a-j*.

In block 530, the configuration engine 210 receives an association of the coverage zones 408*a-e* with one or more of the coverage sets 404*a-d*. Each of the coverage sets 404*a-d* can include a sub-set of band sets, each represented by a data stream of at least some of the signals received from the base stations 12*a-n*. The data streams representing band sets in a coverage set can be provided to one or more coverage zones associated with the coverage set.

In block 540, the configuration engine 210 determines an available bandwidth for each of the communication transport links 28*a-j*. The bandwidth of a communication transport link may be based on the type of communication medium for the communication transport link. In some aspects, the configuration engine 210 can use a discovery function to determine the bandwidth for each communication transport link.

In block 550, the configuration engine 210 determines a plan for configuring the communication transport links 28*a-j* to provide the coverage sets to the coverage zones. The configuration engine 210 can determine the plan based on the association between the coverage sets and the coverage zones, the bandwidth for each of the signals included in the coverage sets 404*a-d*, and the available bandwidth for each of the communication transport links 28*a-j*.

Determining the plan can include determining how many communication transport links a unit 14 can use to provide a coverage set to a destination coverage zone. The configuration engine 210 can determine if the available bandwidth of a single communication transport link between the unit 14 and the destination coverage zone is sufficient for an entire coverage set to be provided over the communication transport link. The available bandwidth of the communication transport link is sufficient if the total bandwidth associated with a coverage set does not exceed the available bandwidth of the communication transport link. The configuration engine 210 can determine the total bandwidth associated with a coverage set by summing the bandwidths of each band set included in a coverage set. The bandwidth of each band set can be determined by summing the bandwidths of each band stream included in the band set. The bandwidth of each band stream can be determined by computing the difference between the highest and lowest frequencies of signals included in the band stream. If the available bandwidth of a single communication transport link is not sufficient for an entire coverage set to be provided over the communication transport link, the configuration engine 210 can assign the signals in the coverage set across multiple communication transport links. Each of the communication transport links between the unit 14 and the destination coverage zone can be used to provide one or more of the signals to the destination coverage zone.

In some aspects, the configuration engine 210 can determine the plan based on the bandwidth for each band stream representing a band set. The configuration engine 210 can assign band streams representing band sets, rather than the digital data streams representing individual signals, across multiple communication transport links based on the bandwidths of the band streams. The configuration engine 210 can determine the bandwidth of a band stream by computing the difference between the highest and lowest frequency signals in the band set represented by the band stream.

In block 560, the configuration engine 210 outputs the plan to the configuration module 26. In some aspects, the configuration module 26 can generate and provide a control signal to the unit 14 for configuring the communication transport links 28*a-j* based on the plan. In other aspects, the configuration module 26 can provide the plan to a user via a graphical interface. The user can configure the communication transport links 28*a-j* based on the plan.

Figure 6:
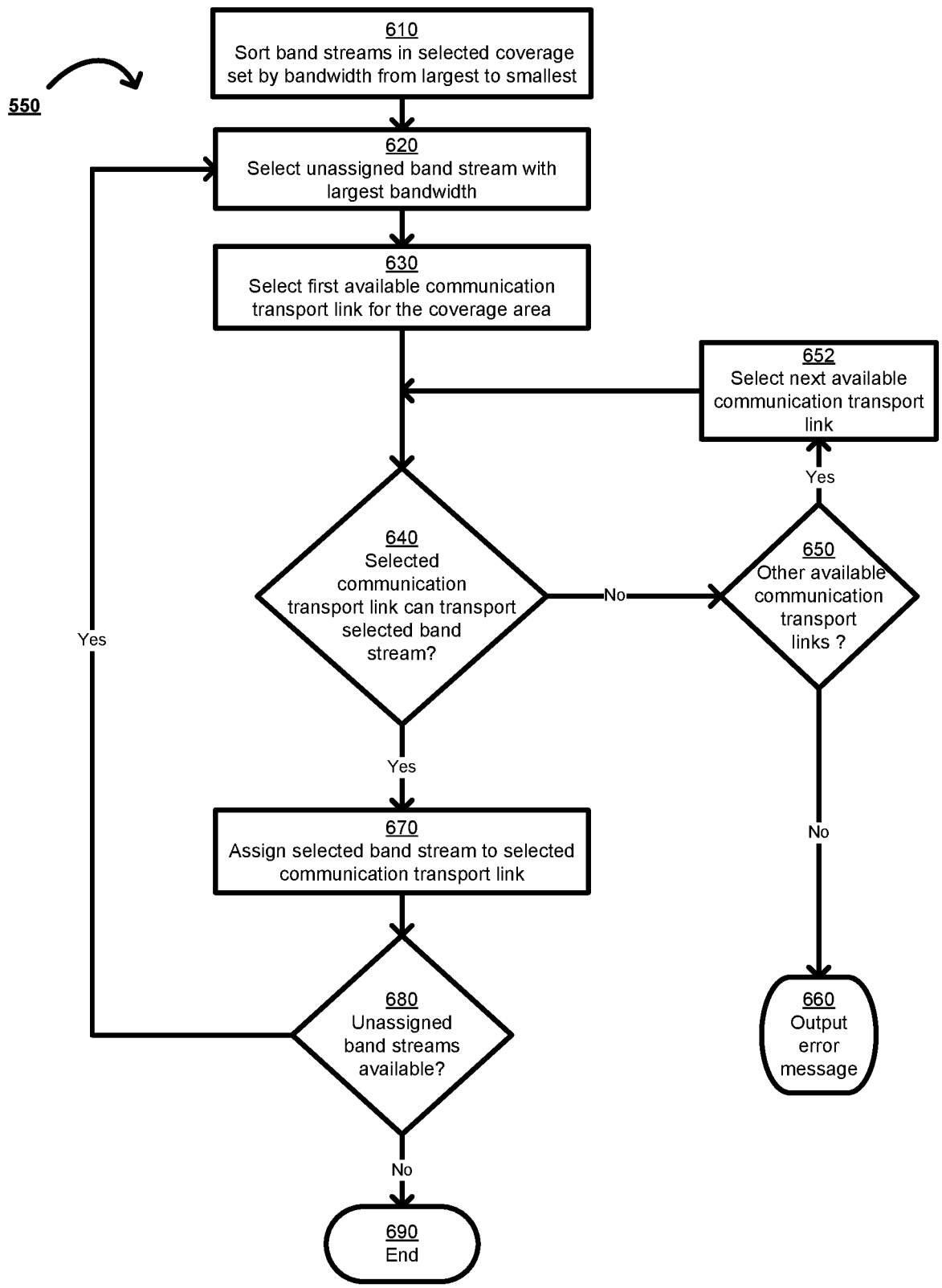
FIG. 6 is a flow chart illustrating a process for configuring communication transport links of a distributed antenna system based on bandwidth of band sets according to one aspect.

FIG. 6 depicts additional details of an aspect of block 550 from FIG. 5.

In block 610, the configuration engine 210 sorts the band streams in the selected coverage set by bandwidth from largest to smallest. For example, if the band streams in coverage set 404*a* represent a band set 402*a* with bandwidth of 5 MHz, a band set 402*b* with a bandwidth of 1.25 MHz, and a band set 402*c* with a bandwidth of 200 kHz, the band streams can be assigned to communication transport links in the order of band set 402*a*, band set 402*b*, and band set 402*c*.

In block 620, the configuration engine 210 selects the unassigned band stream with the largest bandwidth from the coverage set.

In block 630, the configuration engine 210 selects the first available communication transport link between a coverage zone and a unit 14. For example, in FIG. 1, a first coverage zone can include the extension units 16a-b and remote antenna units 18a-d, while a second coverage zone can include the remote antenna units 18e-h. A coverage set 404a may be assigned to the first coverage zone. A unit 14 may communicate with the first coverage zone via the communication transport links 28a, 28d. The configuration engine 210 can select either of the communication transport links 28a, 28d for the unit 14 to provide the coverage set 404a to the first coverage zone in block 630.

In block 640, the configuration engine 210 determines whether the selected communication transport link can transport the selected band stream. In some aspects, the selected communication transport link cannot transport the selected band stream if the bandwidth of the selected band stream exceeds the available bandwidth of the selected communication transport link. The configuration engine 210 can determine whether the bandwidth of the selected band stream is less than the remaining available bandwidth for the selected communication transport link by comparing the total bandwidth of the band streams assigned to the selected communication transport link, the total bandwidth of the communication transport link, and the bandwidth of the selected band stream. If the bandwidth of the selected band stream is greater than the remaining available bandwidth for the selected communication transport link, then the selected communication transport link cannot transport the selected band stream.

In other aspects, the selected communication transport link cannot transport the selected band stream if the number of band streams already assigned to the selected communication transport link is equal to the maximum number of digital data streams that can be provided over the selected communication transport link. The configuration engine 210 can determine the maximum number of digital data streams by referencing a data file stored in the memory 204. The data file can include information about the number of digital data streams that can be provided over various types of communication transport links 28a-j. If the number of band streams assigned to the communication transport link is equal to the maximum number of digital data streams, then the selected communication transport link cannot transport the selected band stream.

If the selected communication transport link cannot transport the selected band stream, the configuration engine 210 determines whether another communication transport link is available in block 650. If another communication transport link is available, the process selects the next available communication transport link in block 652 and returns to block 640. In the example described above with respect to block 630, between unit 14 and a coverage zone may be multiple communication transport links capable of carrying signals between unit 14 and remote antenna units in the coverage zone. The unit 14 may be able to provide the band streams representing the band sets 402a, 402b of a coverage set 404a to the first coverage zone 408a over the one or more of the communication transport links. The unit 14 may not be able to provide the band stream representing the band set 402c to the first coverage zone 408a over a first communication transport link. The configuration engine 210 can determine that a second communication transport link is available in block 650, select the second communication transport link for providing the band set 402c in block 652, and continue the process of assigning the band streams to the communication transport links in block 640.

If no other communication transport links are available, the configuration engine 210 terminates the process and outputs an error message in block 660. The configuration engine 210 can provide the error message via the I/O interface 208 to be displayed at a graphical user interface. An error message can indicate that the DAS 10 cannot provide a coverage set to a destination coverage zone.

If the selected communication transport link can transport the selected band stream, the configuration engine 210 assigns the selected band stream to the selected communication transport link in block 670. The configuration engine 210 can cause the assignment of the band stream to the selected communication transport link to be stored in a data file in the memory 204.

In block 680, the configuration engine 210 determines whether the coverage set includes any remaining unassigned band streams. If the coverage set includes any remaining unassigned band streams, the process returns to block 620. In some aspects, the configuration engine 210 can determine if any unassigned band streams exist by comparing the assignments of band streams to communication transport links stored in the memory 204 with the band streams in each coverage set. If the coverage set does not include any unassigned band streams, the plan for configuring the communication transport links 28a-j is complete and the process terminates at block 690.

Figure 7:
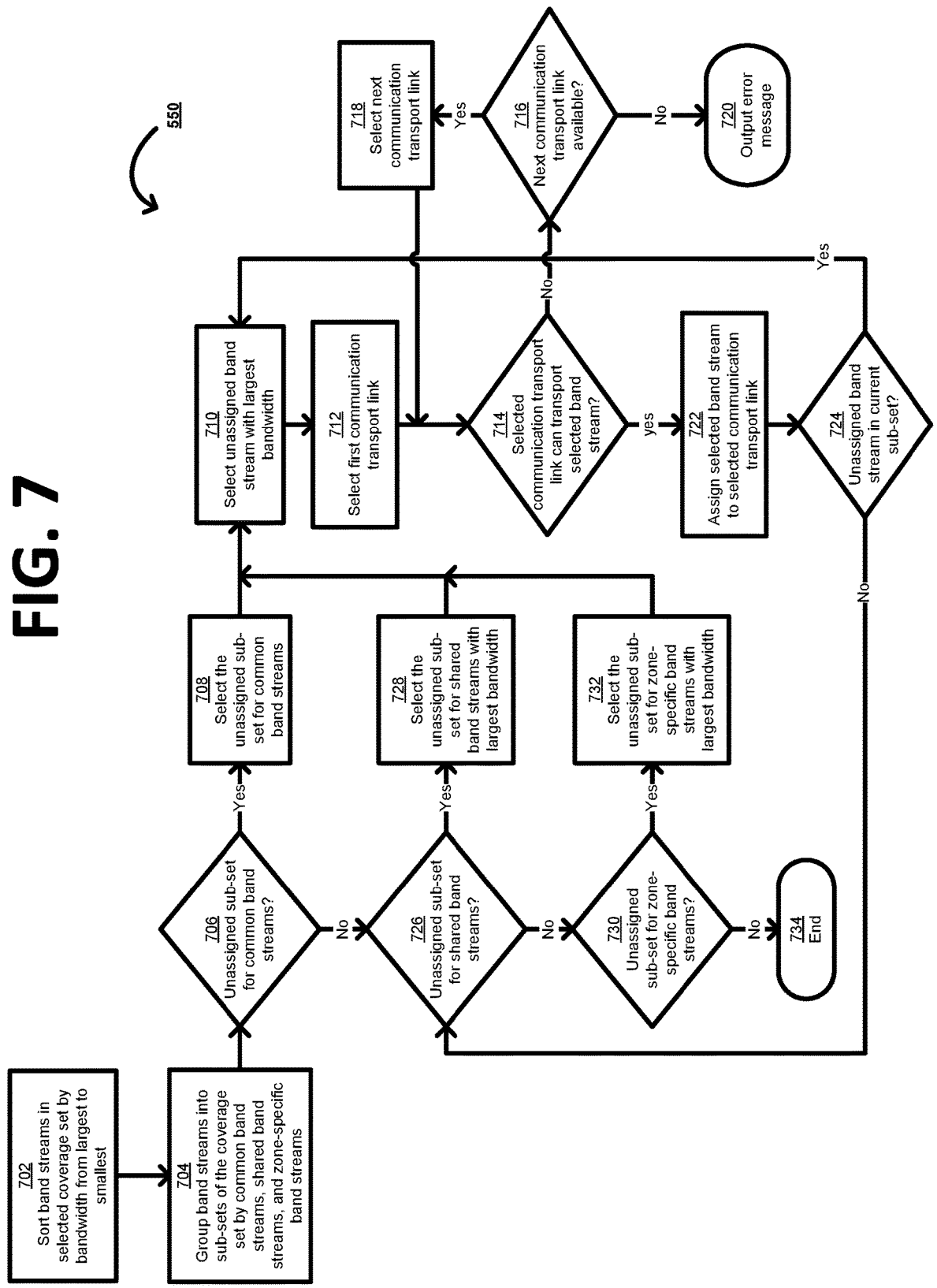
FIG. 7 is a flow chart illustrating a process for configuring the communication transport links using common band sets, shared band sets, and zone-specific band sets according to one aspect.

FIG. 7 depicts additional details of an aspect of block 550 from FIG. 5 using common band sets, shared band sets, and zone-specific band sets. Common band sets can include band sets assigned to all coverage zones 408a-e. Shared band sets can include band sets assigned to more than one but fewer than all coverage zones 408a-e. Zone-specific band sets can include band sets that are assigned to only one of coverage zones 408a-e.

In block 702, the configuration engine 210 sorts the band streams in the selected coverage set by bandwidth from largest to smallest, as in block 610 of the process depicted in FIG. 6.

In block 704, the configuration engine 210 groups into sub-sets the band streams of the selected coverage set. A first sub-set can include all band streams representing the common band sets (i.e., common band streams). One or more sub-sets can include all band streams representing shared band sets (i.e., shared band streams). The configuration engine 210 can sort the sub-sets for shared band streams in decreasing order of sub-set bandwidth. One or more sub-sets can include all band streams representing zone-specific band sets (i.e., zone-specific band streams). The configuration engine 210 can sort the sub-sets for zone-specific band streams in decreasing order of sub-set bandwidth.

In block 706, the configuration engine 210 determines whether an unassigned sub-set for common band streams is available. If so, the configuration engine 210 selects the sub-set for common band streams in block 708.

In block 710, the configuration engine 210 selects the unassigned band stream in the selected sub-set with the largest bandwidth, as in block 620 of the process depicted in FIG. 6.

In block 712, the configuration engine 210 selects the first available communication transport link between a unit 14 and a destination coverage zone, as in block 630 of the process depicted in FIG. 6.

In block 714, the configuration engine 210 determines whether the selected communication transport link can transport the selected band stream, as in block 640 of the process depicted in FIG. 6.

If the selected communication transport link cannot transport the selected band stream, the configuration engine 210 determines whether another communication transport link is available in block 716. If another communication transport link is available, the configuration engine selects the next available communication transport link in block 718 and returns to block 714. The process continues until terminating at block 720 or block 734. If no other communication transport links are available, the configuration engine 210 terminates the process and outputs an error message in block 720.

If the selected communication transport link can transport the selected band stream, the configuration engine 210 assigns the selected band stream to the selected communication transport link in block 722, as in block 670 of the process depicted in FIG. 6.

In block 724, the configuration engine 210 determines whether the selected sub-set includes any remaining unassigned band streams. If the selected sub-set includes any unassigned band streams, the process returns to block 710 and continues until terminating at block 720 or block 734.

If the configuration engine 210 determines in block 706 that no unassigned sub-set for common band streams is available or in block 724 that the selected sub-set does not include any unassigned band streams, the configuration engine 210 determines if any unassigned sub-set for shared band streams is available in block 726. If so, the configuration engine 210 selects the unassigned sub-set for shared band streams with the largest bandwidth in block 728 and returns to block 710. The process continues until terminating at block 720 or block 734. In some aspects, the configuration engine 210 can determine if any unassigned sub-sets are available by referencing a data file stored in the memory 204 including the assignments of band streams and sub-sets to communication transport links.

If the configuration engine 210 determines in block 726 that no unassigned sub-set for shared band streams is available, the configuration engine 210 determines if any unassigned sub-set for zone-specific band streams is available in block 730. If so, the configuration engine 210 selects the unassigned sub-set for zone-specific band streams with the largest bandwidth in block 732 and returns to block 710. The process continues until terminating at block 720 or block 734. If the configuration engine 210 determines in block 730 that no unassigned sub-set for zone-specific band streams is available, the plan for configuring the communication transport links 28*a-j* is complete and the process terminates at block 734.

In some aspects, the configuration engine 210 can use the process depicted in FIG. 7 to configure the communication transport links between a unit and an extension unit. For example, a unit may communicate with several extension units. If the extension units communicate with remote antenna units in overlapping coverage zones, then each extension unit can be associated with one or more coverage zones. Each of the extension units may be associated with remote antenna units that are separately located in all coverage zones, remote antenna units that are separately located in more than one but fewer than all coverage zones, or remote antenna units that are only in a single coverage zone.

In the circumstances described above, the configuration engine 210 can use the process depicted in FIG. 7 to assign band streams to communication transport links between the unit and the extension units. When the configuration engine 210 selects the subset for common band streams in block 708, the available communication transport links in blocks 712-718 can be the communication links between the unit and the extension units associated with all coverage zones. When the configuration engine 210 selects a subset for shared band streams in block 728, the available communication transport links in blocks 712-718 can be the communication links between the unit and the extension units associated with the coverage zones receiving the shared band streams. When the configuration engine 210 selects a sub-set for zone-specific band streams in block 732, the available communication transport links in blocks 712-718 can be the communication links between the unit and the extension units associated with the coverage zone receiving a zone-specific band set.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A method for developing a configuration plan for communication transport links of a distributed antenna system, the distributed antenna system having a unit in communication over the communication transport links with remote antenna units for one or more coverage zones, the unit receiving a plurality of signals from at least one base station, the method comprising:
   determining, for each signal of the plurality of signals, characteristics comprising a respective frequency occupancy of the signal, a respective coverage zone to which to provide the signal, and a respective bandwidth for communicating the signal via at least one of the communication transport links, wherein the frequency occupancy comprises the minimum frequency component and the maximum frequency component of the signal;
   determining a respective available bandwidth of each of the communication transport links between the unit and the remote antenna units that transmit signals in the one or more coverage zones;
   generating the configuration plan based on the determined characteristics of the plurality of signals and the determined respective available bandwidth of each of the communication transport links, wherein the configuration plan includes assignments of different subsets of the plurality of signals to the communication transport links for transmitting the subsets of the plurality of signals to the one or more coverage zones; and
   outputting the configuration plan.

2. The method of claim 1, wherein determining the respective coverage zone for each signal comprises determining an association of coverage zones with respective coverage sets, wherein each coverage zone represents a subset of the remote antenna units, wherein each coverage set represents a subset of signals of the plurality of signals that are to be transported to a common coverage zone.

3. The method of claim 2, wherein the subset of signals of the plurality of signals comprises band sets, each of the band sets comprising a set of signals having an association with the common coverage zone, wherein each of the band sets is represented by a respective band stream.

4. The method of claim 3, further comprising generating each band stream by combining a respective set of signals.

5. The method of claim 4, wherein generating the configuration plan comprises:

for each band set, determining a respective band set bandwidth for communicating a digital representation of all signals in the band set based on the frequency occupancy of all signals in the band set; and generating the configuration plan based on the determined respective available bandwidth of each communication transport link, the band set bandwidth of each band set, and associations between the coverage zones and the respective coverage sets, wherein the configuration plan further specifies the communication transport links via which to deliver band streams representing the band sets to the one or more coverage zones.

6. The method of claim 3, wherein determining the association of coverage zones with respective coverage sets comprises, for each signal of the plurality of signals:

receiving a respective coverage zone to which to provide the signal;

assigning the signal to a respective band set having a plurality of signals associated with a respective band and the respective coverage zone, the respective band set being represented by a respective band stream having a respective band stream bandwidth; and assigning the respective band set to a respective coverage set, the respective coverage set being associated with the respective coverage zone and comprising a plurality of band streams.

7. The method of claim 3, wherein determining the respective coverage zone for each signal of the plurality of signals comprises:

associating each coverage zone of the one or more coverage zones with a subset of the remote antenna units;

for each signal of the plurality of signals, determining a band associated with the signal; and receiving an identification of a respective coverage zone to which to provide the signal;

determining band sets based on the one or more coverage zones and bands associated with the plurality of signals, each of the band sets representing a subset of the plurality of signals associated with respective coverage zone;

determining one or more coverage sets based on the band sets and the one or more coverage zones, each coverage set being associated with at least one of the one or more coverage zones and representing a subset of the band sets.

8. A distributed antenna system, comprising:

a plurality of remote antenna units grouped into one or more coverage zones, each coverage zone comprising a subset of the remote antenna units;

a unit in communication over communication transport links with the plurality of remote antenna units for one or more coverage zones, the unit configured to receive a plurality of signals from at least one base station, the unit comprising a configuration module, wherein the configuration module is configured to:

determine, for each signal of the plurality of signals, characteristics comprising a respective frequency occupancy of the signal, a respective coverage zone to which to provide the signal, and a respective bandwidth for communicating the signal via at least one of the communication transport links, wherein the frequency occupancy comprises the minimum frequency component and the maximum frequency component of the signal;

determine a respective available bandwidth of each of the communication transport links between the unit and the remote antenna units that transmit signals in the one or more coverage zones;

generate a configuration plan based on the determined characteristics of the signals and the determined respective available bandwidth of each of the communication transport links, wherein the configuration plan includes assignments of different subsets of the received signals to the communication transport links for transmitting the subsets of the received signals to the one or more coverage zones; and output the configuration plan.

9. The distributed antenna system of claim 8, wherein determining the respective coverage zone for each signal comprises receiving an association of coverage zones with coverage sets, wherein each coverage zone represents the subset of the remote antenna units, wherein each coverage set represents a subset of signals of the plurality of signals that are to be transported to a common coverage zone.

10. The distributed antenna system of claim 9, wherein the subset of signals of the plurality of signals comprises band sets, each of the band sets comprising a set of signals having an association with the common coverage zone, wherein each of the band sets is represented by a band stream.

11. The distributed antenna system of claim 10, wherein the configuration plan is generated based on bandwidths for communicating digital representations of the band sets, wherein a respective bandwidth of each band set is determined by the frequencies of the signals in the set of signals.

12. The distributed antenna system of claim 11, wherein the configuration module is further configured to generate the configuration plan based on:

a number of communication transport links between a remote antenna unit and the unit;

a determination of whether one or more communication transport links are shared by two or more remote antenna units; and a maximum number of band streams capable of being carried by the communication transport links.

13. The distributed antenna system of claim 10, wherein determining the respective coverage zone for each signal of the plurality of signals comprises:

associating each coverage zone of the one or more coverage zones with a subset of the remote antenna units;

for each signal of the plurality of signals, determining a band associated with the signal; and receiving an identification of a coverage zone of the plurality of coverage zones to which to provide the signal;

determining band sets based on the one or more coverage zones and bands associated with the plurality of signals, each of the band sets representing a subset of the plurality of signals;

determining one or more coverage sets based on the band sets and the plurality of coverage zones, each coverage set being associated with at least one of the plurality of coverage zones and representing a subset of the band sets.

14. The distributed antenna system of claim 10, wherein generating the configuration plan comprises:

for each band set, determining a respective band set bandwidth based on the bandwidth of each signal in the band set; and determining the configuration plan based on the determined respective available bandwidth of each communication transport link, the respective band set bandwidth of each band set, and associations between the coverage zones and the respective coverage sets, wherein the configuration plan further specifies the communication transport links via which to deliver band streams representing the band sets to the coverage zones.

15. A distributed antenna system comprising:

a unit configured to receive a plurality of signals from a base station and communicate the plurality of signals to remote antenna units for a plurality of coverage zones via communication transport links of the distributed antenna system;

a processor disposed in the unit and configured to:

determine, for each signal of the plurality of signals, characteristics comprising a respective frequency occupancy of the signal, a respective coverage zone to which to provide the signal, and a respective bandwidth for communicating the signal via at least one of the communication transport links, wherein the frequency occupancy comprises the minimum frequency component and the maximum frequency component of the signal;

determine a respective available bandwidth of each of the communication transport links between the unit and the remote antenna units that transmit signals in the plurality of coverage zones;

generate a configuration plan based on the determined characteristics of the signals and the determined respective available bandwidth of each of the communication transport links, wherein the configuration plan includes assignments of different subsets of the received signals to the communication transport links for transmitting the subsets of the received signals to the plurality of coverage zones; and output the configuration plan.

16. The distributed antenna system of claim 15, wherein determining the respective coverage zone for each signal comprises receiving an association of coverage zones with coverage sets, wherein each coverage zone represents the subset of the remote antenna units, wherein each coverage set represents a subset of signals of the plurality of signals that are to be transported to a common coverage zone.

17. The distributed antenna system of claim 16, wherein the subset of signals of the plurality of signals comprise band sets, each of the band sets comprising a set of signals having an association with the common coverage zone, the band set being represented by a band stream.

18. The distributed antenna system of claim 17, wherein the configuration plan is generated based on bandwidths for communicating digital representations of the band sets, wherein a respective bandwidth of each band set is determined by the frequencies of the signals in the set of signals.

19. The distributed antenna system of claim 18, wherein the processor is further configured to generate the configuration plan based on:

a number of communication transport links between a remote antenna unit and the unit;

a determination of whether one or more communication transport links are shared by two or more remote antenna units; and a maximum number of band streams capable of being carried by the plurality of communication transport links.

20. The distributed antenna system of claim 17, wherein determining the respective coverage zone for each signal of the plurality of signals comprises:

associating each coverage zone of the plurality of coverage zones with a subset of the remote antenna units;

for each signal of the plurality of signals, determining a band associated with the signal; and receiving an identification of a coverage zone of the plurality of coverage zones to which to provide the signal;

determining band sets based on the plurality of coverage zones and bands of the plurality of signals, each of the band sets representing a subset of the plurality of signals;

determining one or more coverage sets based on the band sets and the plurality of coverage zones, each coverage set being associated with at least one of the plurality of coverage zones and representing a subset of the band sets.

21. The distributed antenna system of claim 10, wherein generating the configuration plan comprises:

for each band set, determining a band set bandwidth based on the bandwidth of each signal in the band set; and determining the configuration plan based on the determined respective available bandwidth of each communication transport link, the band set bandwidth of each band set, and associations between the plurality of coverage zones and the respective coverage sets, wherein the configuration plan further specifies the communication transport links via which to deliver band streams representing the band sets to the plurality of coverage zones.

* * * * *